United States Patent
Zhang et al.

(10) Patent No.: US 10,755,076 B2
(45) Date of Patent: Aug. 25, 2020

(54) FINGERPRINT IMAGE RECOGNITION METHOD, APPARATUS AND TERMINAL

(71) Applicant: GUANGDONG OPPO MOBILE TELECOMMUNICATIONS CORP., LTD., Dongguan, Guangdong (CN)

(72) Inventors: Qiang Zhang, Guangdong (CN); Lizhong Wang, Guangdong (CN); Haitao Zhou, Guangdong (CN); Kui Jiang, Guangdong (CN); Wei He, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 257 days.

(21) Appl. No.: 15/759,359

(22) PCT Filed: Aug. 1, 2016

(86) PCT No.: PCT/CN2016/092697
§ 371 (c)(1),
(2) Date: Mar. 12, 2018

(87) PCT Pub. No.: WO2017/067270
PCT Pub. Date: Apr. 27, 2017

(65) Prior Publication Data
US 2018/0253581 A1 Sep. 6, 2018

(30) Foreign Application Priority Data
Oct. 19, 2015 (CN) .......................... 2015 1 0681069

(51) Int. Cl.
G06K 9/00 (2006.01)
G06F 17/16 (2006.01)
G06K 9/62 (2006.01)

(52) U.S. Cl.
CPC ............. G06K 9/001 (2013.01); G06F 17/16 (2013.01); G06K 9/00006 (2013.01); G06K 9/00013 (2013.01); G06K 9/6202 (2013.01)

(58) Field of Classification Search
CPC .. G06K 9/00006; G06K 9/001; G06K 9/0008; G06F 21/32
See application file for complete search history.

(56) References Cited

U.S. PATENT DOCUMENTS 6,917,694 B1 * 7/2005 Machida ............ G06K 9/00006
340/5.53
2005/0259502 A1 * 11/2005 Shimamura ........... G06F 7/5095
365/232
(Continued)

FOREIGN PATENT DOCUMENTS

CN 1221161 A 6/1999
CN 101470804 A 7/2009
(Continued)

OTHER PUBLICATIONS

U.S. Appl. No. 16/201,470 Office Action dated Aug. 21, 2019, 10 pages.
(Continued)

*Primary Examiner* — Gandhi Thirugnanam
(74) *Attorney, Agent, or Firm* — Lathrop GPM LLP

(57) ABSTRACT

A fingerprint image recognition method is provided. The method includes: acquiring a target image from a captured texture image; acquiring target shape features corresponding to the target image, the target shape feature being configured to represent a shape feature of the target image; and when the target shape features matches with a preset finger shape feature, determining to perform a fingerprint recognition on the texture image. Also provided in the present invention are a fingerprint image recognition apparatus and a terminal.

17 Claims, 6 Drawing Sheets

(56) References Cited

U.S. PATENT DOCUMENTS

| | | | | |
|---|---|---|---|---|
| 2007/0047785 A1* | 3/2007 | Jang | ................... | G06K 9/0008 382/125 |
| 2007/0271224 A1* | 11/2007 | Essafi | ................... | G06F 16/41 |
| 2007/0292005 A1* | 12/2007 | Lo | ................... | G06K 9/0008 382/124 |
| 2011/0096962 A1* | 4/2011 | Kuo | ................... | G06K 9/0008 382/124 |
| 2012/0057011 A1* | 3/2012 | Horng | ................... | G06K 9/00006 348/77 |
| 2014/0294259 A1* | 10/2014 | Lee | ................... | G06K 9/00013 382/124 |
| 2015/0371073 A1* | 12/2015 | Cho | ................... | G06F 3/04886 382/124 |
| 2016/0147987 A1* | 5/2016 | Jang | ................... | G06F 21/32 726/19 |
| 2016/0335472 A1* | 11/2016 | Lee | ................... | G06K 9/00046 |
| 2017/0103253 A1* | 4/2017 | Pyun | ................... | G06K 9/00026 |
| 2018/0253581 A1* | 9/2018 | Zhang | ................... | G06K 9/00006 |
| 2019/0147210 A1* | 5/2019 | Zhang | ................... | G06K 9/00006 |

FOREIGN PATENT DOCUMENTS

| | | |
|---|---|---|
| CN | 102687172 A | 9/2012 |
| CN | 103870071 A | 6/2014 |
| CN | 104598870 A | 5/2015 |
| CN | 104615991 A | 5/2015 |
| CN | 102789574 B | 7/2015 |
| CN | 104751103 A | 7/2015 |
| CN | 104951748 A | 9/2015 |
| CN | 105389541 A | 3/2016 |
| JP | H02270075 A | 11/1990 |
| WO | WO 2015009111 A1 | 1/2015 |
| WO | WO 2015105360 A1 | 7/2015 |

OTHER PUBLICATIONS

European Patent Application No. 16856705.5 extended Search and Opinion dated Jul. 10, 2018.
PCT/CN2016/092697 International Search Report and Written Opinion dated Oct. 27, 2017, 12 pages.
PCT/CN2016/092697 English translation of the International Search Report and Written Opinion dated Oct. 27, 2017, 10 pages.
Chinese Patent Application No. 201510681069.X Office Action dated Oct. 26, 2017, 6 pages.
Chinese Patent Application No. 201510681069.X English translation of Office Action dated Oct. 26, 2017, 6 pages.

* cited by examiner

FINGERPRINT IMAGE RECOGNITION METHOD, APPARATUS AND TERMINAL

CROSS-REFERENCE TO RELATED APPLICATION

This application is a U.S. National phase application of International Application No. PCT/CN2016/092697, filed on Aug. 1, 2016, which claims priority to and benefits of Chinese Patent Application No. 201510681069.X, filed with the State Intellectual Property Office of P. R. China on Oct. 19, 2015, and titled with "fingerprint image recognition method and apparatus", the entire content of which is incorporated herein by reference.

FIELD

Embodiments of the present disclosure relate to fingerprint recognition technologies, and more particularly to, a fingerprint image recognition method, a fingerprint image recognition apparatus and a terminal.

BACKGROUND

With the development of electronic devices, fingerprint recognition technology is widely applied to intelligent terminals. Users can unlock the intelligent terminal or perform other operations on the intelligent terminal by fingerprint recognition.

In the related art, the fingerprint recognition is performed by using a capacitive fingerprint sensor. Since the human body is a conductor, when a finger presses the capacitive fingerprint sensor, the fingerprint sensor can obtain a texture of the finger, and then the fingerprint recognition is performed according to the texture.

SUMMARY

The present disclosure provides a fingerprint image recognition method, a fingerprint image recognition apparatus and a terminal, so as to effectively recognize a captured image, and improve resource utilization of a terminal.

Embodiments of the present disclosure provide a fingerprint image recognition method, including: acquiring a target image from a captured texture image; acquiring a target shape feature corresponding to the target image, the target shape feature being configured to represent a shape feature of the target image; and when the target shape feature matches with a preset finger shape feature, determining to perform a fingerprint recognition on the texture image.

Embodiments of the present disclosure provide a fingerprint image recognition apparatus, including: a target image acquiring unit, configured to acquire a target image from a captured texture image; a shape feature acquiring unit, configured to acquire a target shape feature corresponding to the target image acquired by the target image acquiring unit, the target shape feature being configured to represent a shape feature of the target image; and a fingerprint image determining unit, configured to perform a fingerprint recognition on the texture image when the target shape feature acquired by the shape feature acquiring unit matches with a preset finger shape feature.

Embodiments of the present disclosure provide a terminal. The terminal includes a fingerprint sensor and a fingerprint image recognition apparatus. The fingerprint sensor is coupled to the fingerprint image recognition apparatus. The fingerprint image recognition apparatus includes: a target image acquiring unit, configured to acquire a target image from a captured texture image; a shape feature acquiring unit, configured to acquire a target shape feature corresponding to the target image acquired by the target image acquiring unit, the target shape feature being configured to represent a shape feature of the target image; and a fingerprint image determining unit, configured to perform a fingerprint recognition on the texture image when the target shape feature acquired by the shape feature acquiring unit matches with a preset finger shape feature.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

First Embodiment

Figure 1:
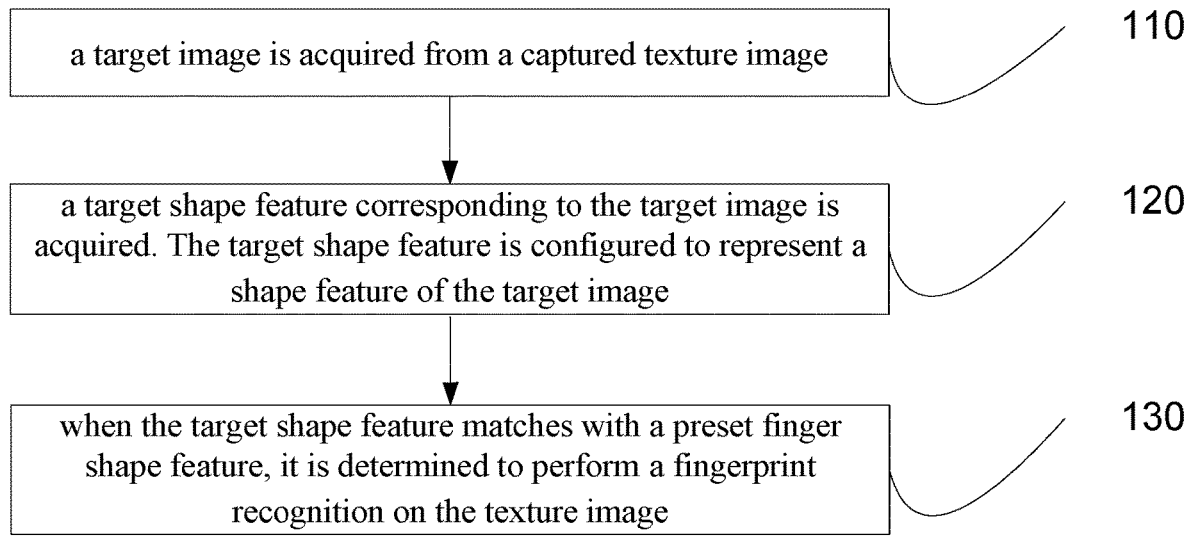
FIG. 1 is a flow chart of a fingerprint image recognition method in a first embodiment of the present disclosure.

FIG. 1 is a flow chart of a fingerprint image recognition method in the first embodiment of the present disclosure. The embodiment may be applied to a situation in which an intelligent terminal performs a fingerprint recognition. The method may be performed by the intelligent terminal having a fingerprint recognition function. The intelligent terminal may be such as a smart phone, a tablet computer, etc. The method may include the following.

At block 110, a target image is acquired from a captured texture image.

The intelligent terminal acquires the texture image through a fingerprint sensor. The texture image may be a grayscale image. The target image may be the texture image, or may also be a sub-image in the texture image.

At block 120, a target shape feature corresponding to the target image is acquired. The target shape feature is configured to represent a shape feature of the target image.

The target shape feature includes a plurality of feature values, and each feature value is configured to represent a width of a row of the target image, so as to depict the shape of the target image. In at least one embodiment, each feature value may also be configured to represent a length of a column of the target image, and the shape of the target image is depicted by the length of each column. For example, the feature value is the number of texture pixel points included in a row. The texture image acquired by the fingerprint sensor is a grayscale image, and a pixel point with a grayscale value (a pixel value) greater than a preset grayscale value in the grayscale image is determined as the texture pixel point. The preset grayscale value may be a value within a range of 150-255, in an embodiment, the preset grayscale value is 200.

Color of each pixel in the grayscale image is represented by a RGB (red, green and blue) triple. For convenience of calculation, for the (R, G, B) triple of each pixel, the grayscale value (i.e., the pixel value) Gray corresponding to the (R, G, B) triple can be obtained by any one of the following conversion ways.

Way one, a floating-point algorithm, Gray=$R \times 0.3+ G \times 0.59 + B \times 0.11$.

Way two, an integer method, Gray=$(R \times 30 + G \times 59 + B \times 11) \div 100$.

Way three, a mean value method, Gray=$(R+G+B) \div 3$.

Way four, only green is taken, Gray=$G$.

Figure 2:
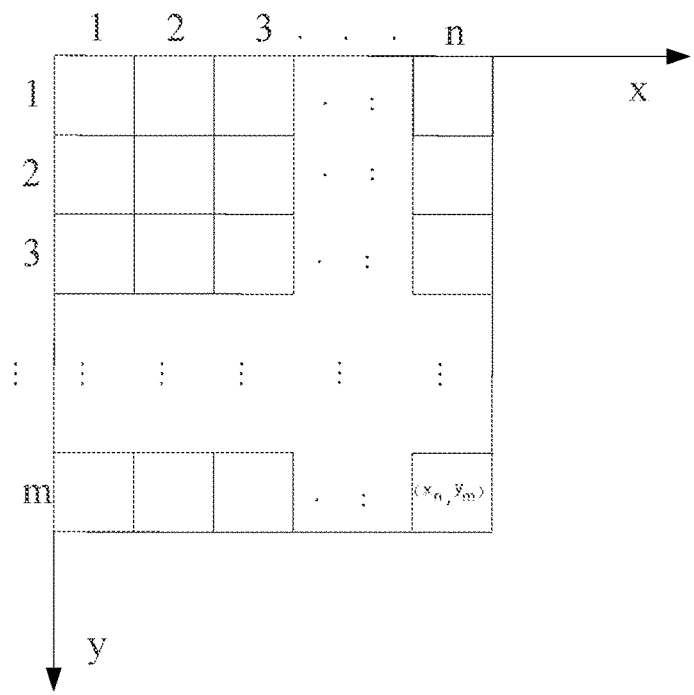
FIG. 2 is a schematic diagram of coordinates of a texture image in the first embodiment of the present disclosure.

The grayscale value (i.e., the pixel value of the pixel point) corresponding to the pixel point can be obtained by any one of the above ways. Each coordinate point in the texture image corresponds to a pixel point, and each pixel point has a unique pixel value, such as the grayscale value Gray. For convenience of description, in this embodiment and subsequent embodiments, the coordinates of the texture image illustrated in FIG. 2 will be taken as an example. As illustrated in FIG. 2, the texture image is formed by a pixel point matrix with m rows and n columns, and includes m×n pixel points. The pixel value corresponding to the pixel point $(x_n, y_m)$ located in $m^{th}$ row and $n^{th}$ column is $G_{nm}$. In at least one embodiment, m=n=480.

At block 130, when the target shape feature matches with a preset finger shape feature, it is determined to perform a fingerprint recognition on the texture image.

The preset finger shape feature is configured to characterize a shape feature of the fingerprint of the finger. The preset finger shape feature may be a change trend of a width of the fingerprint or a change trend of a length of the fingerprint.

Figure 3:
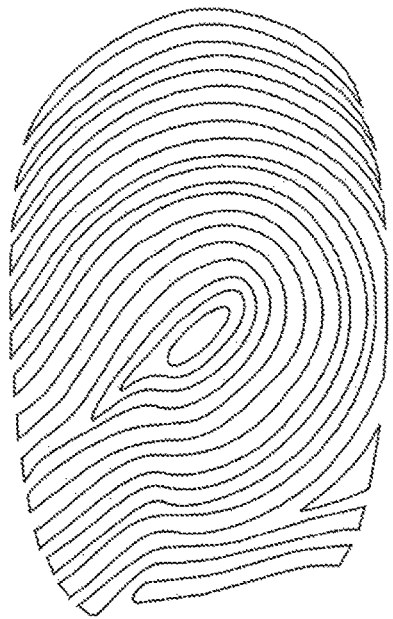
FIG. 3 is a schematic diagram of a texture image of a fingerprint in the first embodiment of the present disclosure.

For example, when the preset finger shape feature indicates a change trend, as illustrated in FIG. 3, the change trend of the width of the fingerprint indicates that the width of the fingerprint changes firstly from narrow to wide and then from wide to narrow when viewed from top to bottom. When a width of the fingerprint sensor is less than a width of a part of the fingerprint, the width of the part of the fingerprint acquired by the fingerprint sensor is constant. When a length of the fingerprint sensor is less than a length of a part of the fingerprint of the finger, the length of the part of the fingerprint acquired by the fingerprint sensor is constant.

In the related art, in the use of the intelligent terminal, when a non-finger object, such as clothing fabric, palm skin or the like, touches the fingerprint sensor, the fingerprint sensor may recognize the non-finger object, thereby resulting in a waste of system resources and low resource utilization.

With the technical solutions provided by embodiments of the present disclosure, before the fingerprint recognition is performed, the target shape feature corresponding to the target image in the texture image is acquired, when the target shape feature matches with the preset finger shape feature, it is determined to perform the fingerprint recognition on the texture image. Compared with the related art in which the fingerprint recognition is directly performed on the texture image, in embodiments of the present disclosure, before the fingerprint recognition is performed, it is determined whether the target image in the texture image matches with the preset finger shape feature, and when the target image matches with the preset finger shape feature, the fingerprint recognition is performed on the texture image, such that unnecessary fingerprint recognition on non-finger objects can be avoided, thereby improving utilization of system resources and recognition efficiency.

Second Embodiment

Figure 4:
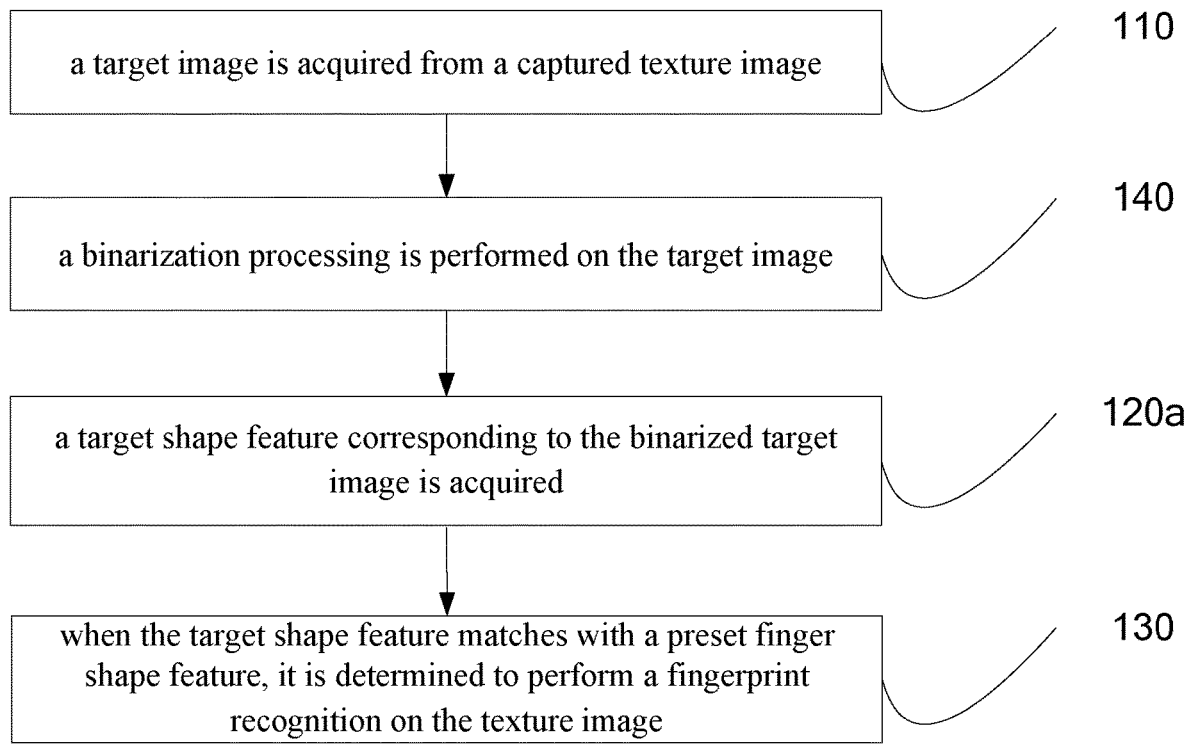
FIG. 4 is a flow chart of a fingerprint image recognition method in a second embodiment of the present disclosure.

Embodiments of the present disclosure further provide a fingerprint image recognition method, as a further explanation of the first embodiment. As illustrated in FIG. 4, after the target image is acquired at block 110, the method further includes the following.

At block 140, a binarization processing is performed on the target image.

A threshold T is set, and pixel points in the target image are partitioned into two groups by the threshold T, which are respectively a first pixel group including pixel points each with a pixel value greater than or equal to the threshold T and a second pixel group including pixel points each with a pixel value less than the threshold T. The pixel values of pixel points in the first pixel group are set to white (or black). The pixel values of pixel points in the second pixel group are set to black (or white). After the binarization processing, the pixel values of the pixel points in the target image are 0 or 1. When the target image is a fingerprint image, pixel values of pixel points corresponding to textures of the fingerprint are 1 (or 0), and pixel values of pixel points corresponding to gaps between the textures of the fingerprint are 0 (or 1). When the target image is a grayscale image, the grayscale value (i.e., the pixel value) corresponding to the threshold T ranges from 0 to 255, for example, the grayscale value of the threshold T is 120.

Accordingly, at block 120, acquiring the target shape feature corresponding to the target image may be implemented in the following ways.

At block 120a, a target shape feature corresponding to the binarized target image is acquired.

After the binarization, the pixel point having a pixel value set to 1 in each row of the target image is configured as a texture pixel point. The width of the texture image in the target image is determined according to the width occupied by the texture pixel points. For pixel points in any row of the target image, the pixel value of pixel point in each column is acquired sequentially starting from the first column, such that the first pixel point with a pixel value of 1 and the last pixel point with a pixel value of 1 are acquired, and the width of the texture image in the target image is determined according the two pixel points.

With the technical solutions provided by embodiments of the present disclosure, the binarization processing can be performed on the target image to obtain the binarized image. Since the pixel values of the pixel points in the binarized image are 0 or 1, the complexity of acquiring the target shape feature of the target image can be reduced, the speed of calculating a variance can be increased, and thus the efficiency of the image recognition can be improved.

Figure 5:
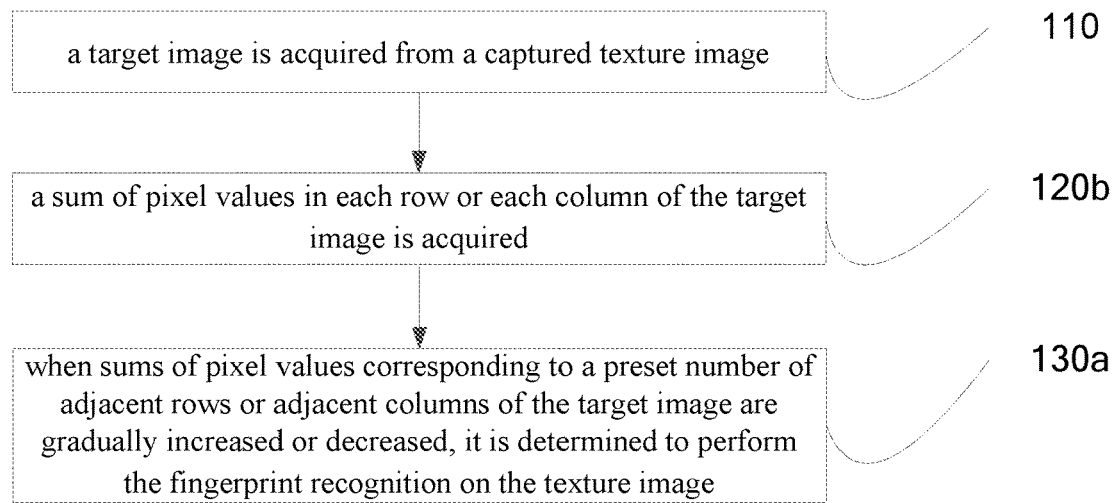
FIG. 5 is a flow chart of another fingerprint image recognition method in the second embodiment of the present disclosure.

Embodiments of the present disclosure further provide a fingerprint image recognition method, as a further explanation of the first embodiment. As illustrated in FIG. 5, acquiring the target shape feature corresponding to the target image at block 120 may be implemented in the following ways.

At block 120b, a sum of pixel values in each row or each column of the target image is acquired.

When the width of a row is increased, it indicates that the pixel points included in this row are increased, such that the sum of the pixel values corresponding to this row is increased accordingly. Therefore, the width of the row can be represented by the sum of pixel values in the row. When the sum of the pixel values in a row is increased, the width of this row is increased accordingly. When the sum of the pixel values in a row is decreased, the width of this row is decreased accordingly.

Similarly, when the length of a column is increased, it indicates that the pixel points included in this column are increased, such that the sum of the pixel values corresponding to this column is increased accordingly. Therefore, the length of the column can be represented by the sum of the pixel values in the column. When the sum of the pixel values in a column is increased, the length of this column is increased accordingly. When the sum of the pixel values in a column is decreased, the length of this column is decreased accordingly.

In an implementation, taking the row as a unit, the sum of the pixel values of the pixel points in the same row is calculated respectively. Firstly, all the pixel points $[(x_1, y_1), (x_2, y_1) \ldots (x_n, y_1)]$ and their pixel values $[G_{11}, G_{12}, K, G_{1n}]$ in the first row are acquired, and a sum $A_1$ of the pixel values $[G_{11}, G_{12}, K, G_{1n}]$ of the pixel points in the first row is calculated. Then, all the pixel points $[(x_1, y_2), (x_2, y_2) \ldots (x_n, y_2)]$ and their pixel values $[G_{21}, G_{22}, K, G_{2n}]$ in the second row are acquired, and a sum $A_2$ of the pixel values $[G_{21}, G_{22}, K, G_{2n}]$ of the pixel points in the second row is calculated. By analogy, sums $[A_3, A_4, \ldots, A_m]$ of the pixel values of the pixel points in the third row to the $m^{th}$ row are obtained.

In another implementation, taking the column as a unit, the sum of the pixel values of the pixel points in the same column is calculated respectively. Firstly, all the pixel points $[(x_1, y_1), (x_1, y_2) \ldots (x_1, y_m)]$ and their pixels values $[G_{11}, G_{21}, K, G_{m1}]$ in the first column are acquired, and a sum $B_1$ of the pixels values $[G_{11}, G_{21}, K, G_{m1}]$ of the pixel points in the first column is calculated. Then, all the pixel points $[(x_2, y_1), (x_2, y_2) \ldots (x_2, y_m)]$ and their pixel values $[G_{12}, G_{22}, K, G_{m2}]$ in the second column are acquired, and a sum $B_2$ of the pixel values $[G_{12}, G_{22}, K, G_{m2}]$ of the pixel points in the second column is calculated. By analogy, sums $[B_3, B_4, \ldots, B_n]$ of the pixel values of the pixel points in the third column to the $n^{th}$ column are obtained.

Accordingly, when the target shape feature match with the preset finger shape feature, determining to perform the fingerprint recognition on the texture image at block 130 includes the following.

At block 130a, when sums of pixel values corresponding respectively to a preset number of adjacent rows or adjacent columns of the target image are gradually increased or decreased, it is determined to perform the fingerprint recognition on the texture image.

The distribution characteristics of the fingerprint of the finger are that the fingerprint is narrow at top and bottom and is wide in middle. It is determined whether a change trend of the numeric values of $[A_1, A_2, \ldots, A_m]$ is changing from small to big, and then from big to small. When yes, it is determined to perform the fingerprint recognition on the texture image. In an embodiment, it is determined whether a change trend of the numeric values of $[B_1, B_2, \ldots, B_n]$ is changing from small to big, and then from big to small. When yes, it is determined to perform the fingerprint recognition on the texture image.

In at least one embodiment, since the width change is obvious at the top and bottom of the fingerprint, it can use top and bottom of the target image as objects to determine whether it is a finger image. In detail, it is determined whether sums corresponding to the first N rows (top) of the target image are gradually increased, and/or it is determined whether sums corresponding to the last N rows (bottom) of the target image are gradually decreased. N is a positive integer greater than 2, preferably 80.

In addition, there may be hop values in the sums corresponding to the first N rows or the sums corresponding to the last N rows of the target image. In order to prevent the hop values from affecting a judgment result of the target image, when the number of the hop values is less than a preset threshold, the hop values are deleted, so as to reduce interference of noises on determining whether it is the fingerprint image. The preset threshold ranges from 5 to 10, preferably 8.

With the technical solution provided by embodiments of the present disclosure, it is possible to determine whether the target image is the fingerprint image according to the change trend of the sums of pixels values corresponding to the rows or columns of the target image, thereby improving an efficiency of the fingerprint recognition.

Figure 6:
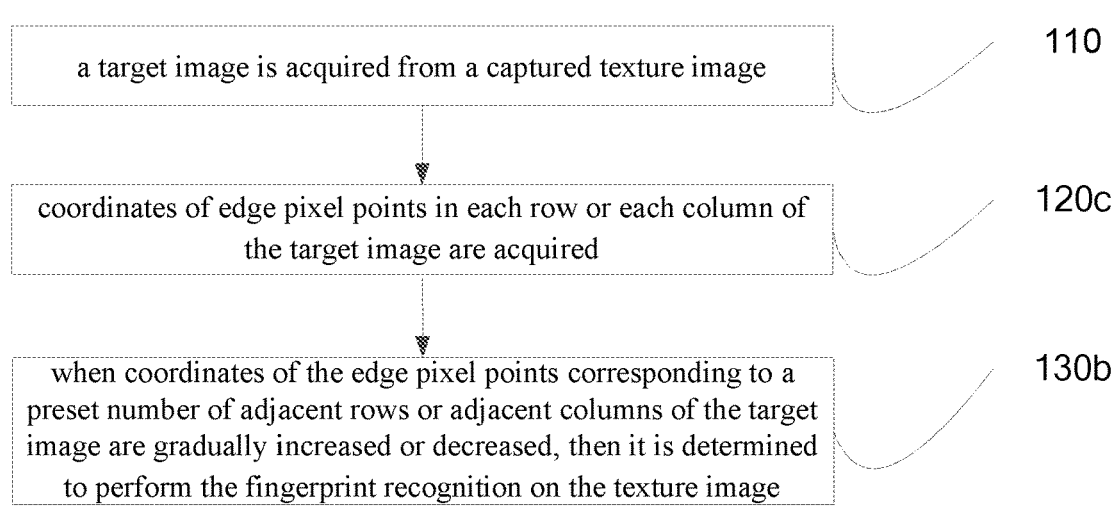
FIG. 6 is a flow chart of yet another fingerprint image recognition method in the second embodiment of the present disclosure.

Embodiments of the present disclosure further provide a fingerprint image recognition method, as a further explanation of the above embodiments. As illustrated in FIG. 6, acquiring the target shape feature corresponding to the target image at block 120 may be implemented in the following ways.

At block 120c, coordinates of edge pixel points in each row or each column of the target image are acquired.

Acquiring the coordinates of the edge pixel points in each row of the target image can be implemented as follows.

For any column of the target image, the pixel value of each pixel in the column is acquired.

Pixel points each with the pixel value greater than or equal to a preset pixel value are searched sequentially from the first column to the last column. When a pixel point whose pixel value is greater than or equal to the preset pixel value is found, and a column number of the pixel point is smaller than a maximum column number, the pixel point is determined as an edge pixel point P of the row, and a row number and a column number of the edge pixel point P form its coordinate.

Pixel points each with the pixel value greater than or equal to a preset pixel value are searched sequentially from the last column to the first column. When a pixel point whose pixel value is greater than or equal to a preset pixel value is found, and a column number of the pixel point is greater than a minimum column number, the pixel point is determined as another edge pixel point Q of the row, and a row number and a column number of the edge pixel point Q form its coordinate.

For the way to acquire the coordinates of the edge pixel points in each column of the target image, reference may be made to the foregoing way to acquire the coordinates of the edge pixel points in each row, and details are not described herein again.

Accordingly, when the target shape feature match with the preset finger shape feature, determining to perform the fingerprint recognition on the texture image at block 130 includes the following.

At block 130b, when coordinates of the edge pixel points corresponding respectively to a preset number of adjacent rows or adjacent columns of the target image are gradually increased or decreased, it is determined to perform the fingerprint recognition on the texture image.

The preset number of rows may be all rows included in the target image, or may be the first N rows or the last N rows of the target image.

When abscissas of the edge pixel points Ps corresponding to the preset number of adjacent rows decrease with the increasing of ordinates of the edge pixel points Ps, and abscissas of the edge pixel points Qs corresponding to the preset number of adjacent rows increase with the increasing of ordinates of the edge pixel points Qs, it is determined to perform the recognition on the texture image.

With the technical solution provided by embodiments of the present disclosure, it is possible to determine whether the target image is the fingerprint image according to a change trend of coordinates of the edge pixel points corresponding to the preset number of adjacent rows or adjacent columns of the target image, thereby improving the accuracy of the fingerprint image recognition.

Figure 7:
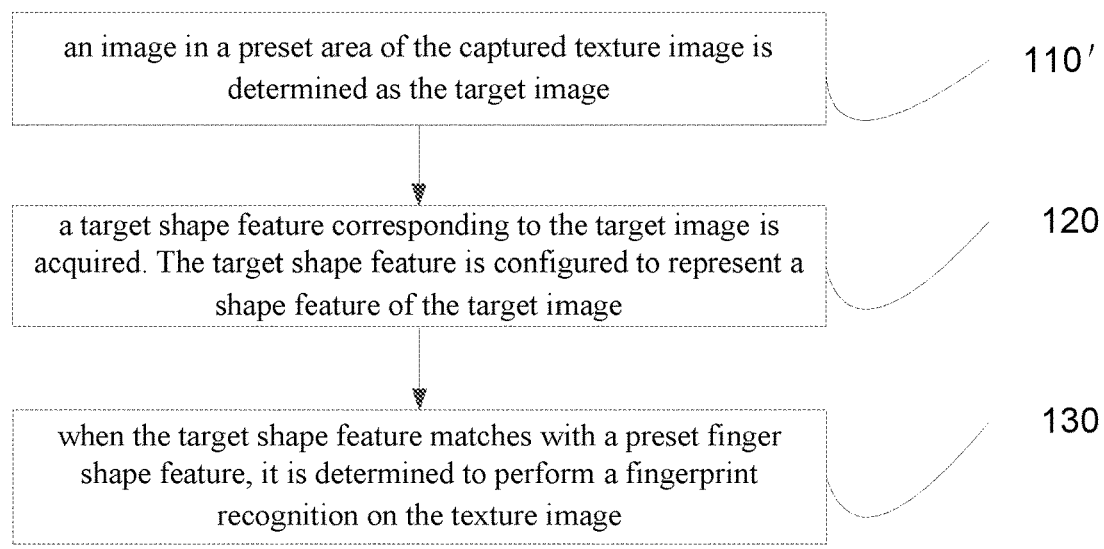
FIG. 7 is a flow chart of a still fingerprint image recognition method in the second embodiment of the present disclosure.

Embodiments of the present disclosure further provide a fingerprint image recognition method, as a further explanation of the above embodiments. As illustrated in FIG. 7, acquiring the target image from the captured texture image at block 110 may be implemented in the following ways.

At block 110', an image in a preset area of the captured texture image is determined as the target image.

Figure 8:
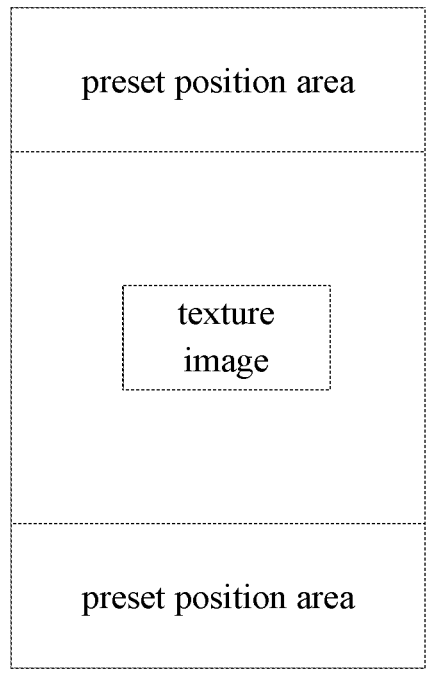
FIG. 8 is a schematic diagram of a position of a preset area in the second embodiment of the present disclosure.

The size of the preset area can be determined according to a rated recognition range of the fingerprint sensor. In at least one embodiment, as illustrated in FIG. 8, a width of the preset area is the same as a width of the fingerprint sensor, a length of the preset area is one quarter of a length of the fingerprint sensor, and the preset area is located at the top or bottom of a fingerprint recognition area.

With the technical solution provided by embodiments of the present disclosure, since the top and bottom areas of the fingerprint image can clearly represent the shape feature of the finger, computation of pixel values can be reduced by determining whether the texture image is the fingerprint image using the top and bottom of the texture image, thereby improving the efficiency of the fingerprint image recognition.

Figure 9:
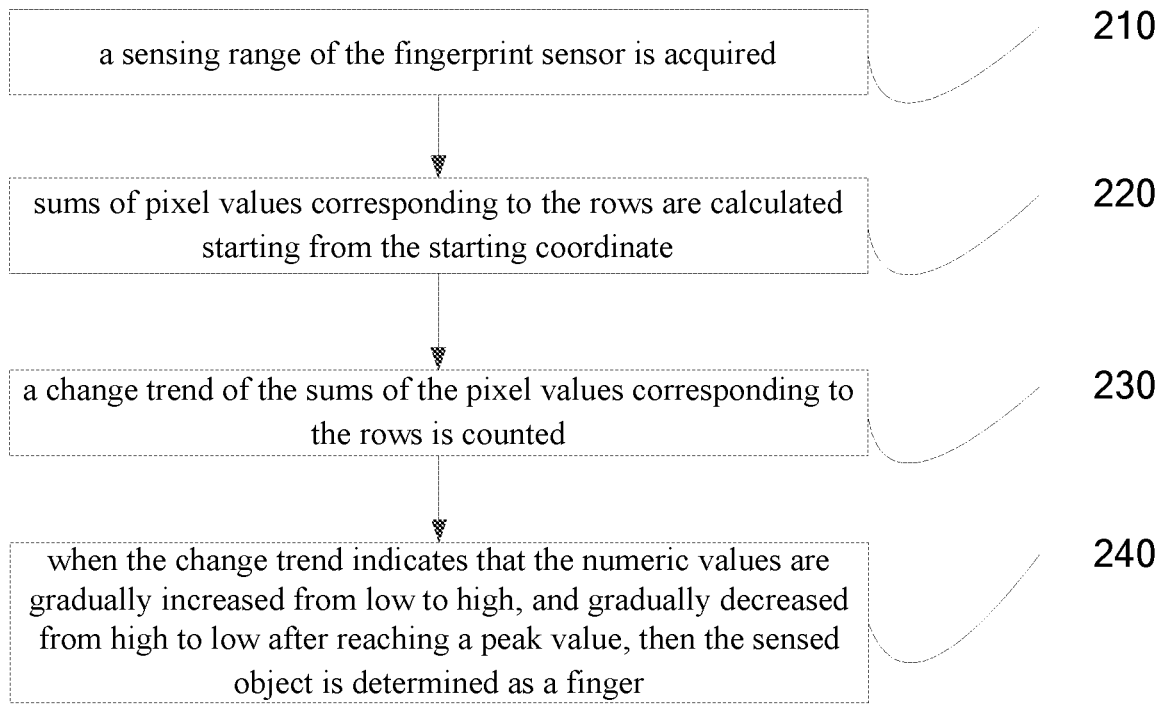
FIG. 9 is a flow chart of still another fingerprint image recognition method in the second embodiment of the present disclosure.

In the following, the above embodiments are further described through a usage scenario. As illustrated in FIG. 9, the method includes the following.

At block 210, a sensing range of the fingerprint sensor is acquired.

The sensing range ranges from a starting coordinate (0, 0) to an ending coordinate (x, y).

At block 220, sums $[A_0, A_1, \ldots, A_y]$ of pixel values corresponding to the rows are calculated starting from the starting coordinate (0, 0).

At block 230, a change trend of the sums of the pixel values corresponding to the rows is counted.

At block 240, when the change trend indicates that the numeric values are gradually increased from low to high, and gradually decreased from high to low after reaching a peak value, the sensed object is determined as a finger.

The numeric values are gradually increased from low to high indicates that a pressing area is gradually increased from top to bottom. The numeric values are gradually decreased from high to low after reaching the peak value indicates that the pressing area is gradually decreased from top to bottom.

Third Embodiment

Figure 10:
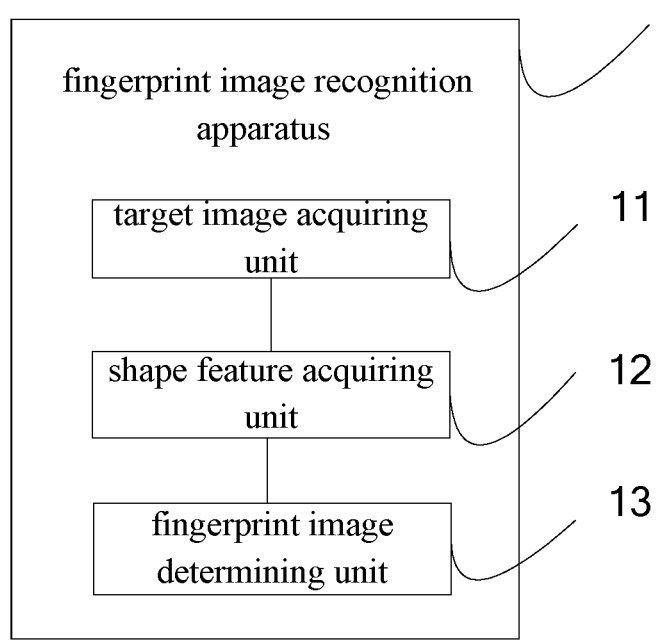
FIG. 10 is a block diagram of a fingerprint image recognition apparatus in a third embodiment of the present disclosure.

Embodiments of the present disclosure further provide a fingerprint image recognition apparatus 1. The apparatus 1 is configured to implement the method described in the above embodiments, and is located in an intelligent terminal. As illustrated in FIG. 10, the apparatus 1 includes a target image acquiring unit 11, a shape feature acquiring unit 12 and a fingerprint image determining unit 13.

The target image acquiring unit 11 is configured to acquire a target image from a captured texture image.

The shape feature acquiring unit 12 is configured to acquire a target shape feature corresponding to the target image acquired by the target image acquiring unit 11. The target shape feature is configured to represent a shape feature of the target image.

The fingerprint image determining unit 13 is configured to perform a fingerprint recognition on the texture image when the target shape feature acquired by the shape feature acquiring unit 12 matches with a preset finger shape feature.

Figure 11:
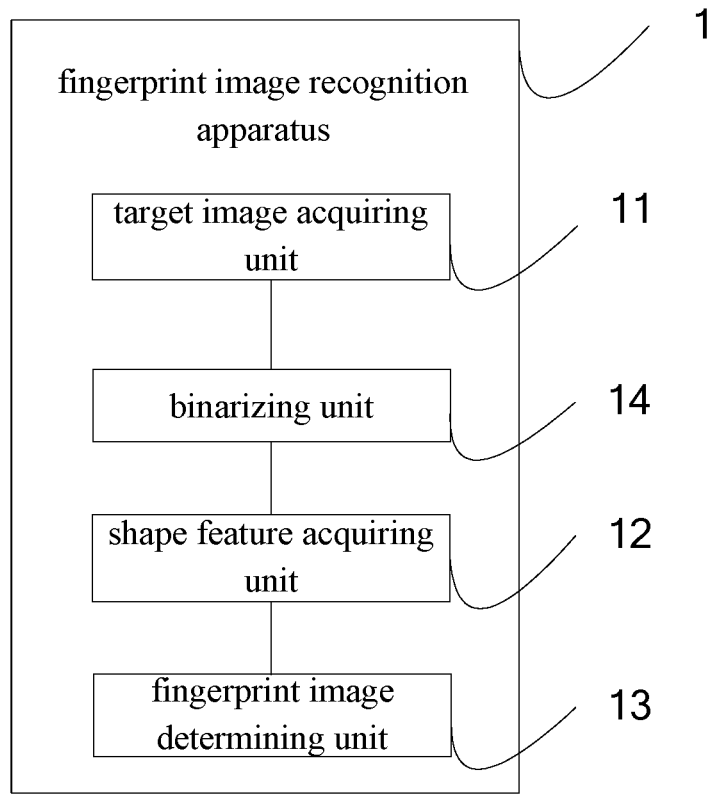
FIG. 11 is a block diagram of another fingerprint image recognition apparatus in the third embodiment of the present disclosure.

In addition, as illustrated in FIG. 11, the apparatus further includes a binarizing unit 14.

The binarizing unit 14 is configured to perform a binarization processing on the target image acquired by the target image acquiring unit 11.

The target image acquiring unit 11 is further configured to acquire the target shape feature corresponding to the target image binarized.

In addition, the shape feature acquiring unit 12 is further configured to acquire a sum of pixel values in each row or each column of the target image. The fingerprint image determining unit 13 is further configured to perform the fingerprint recognition on the texture image when sums of pixel values corresponding to a preset number of adjacent rows or adjacent columns of the target image are gradually increased or decreased.

In addition, the shape feature acquiring unit 12 is further configured to: acquire a number of hop values in the sums after acquiring the sum of the pixel values in each row or each column of the target image; determine whether the number of the hop values is less than a preset threshold; and delete the hop values when the number of the hop values is less than the preset threshold.

In addition, the shape feature acquiring unit 12 is further configured to acquire coordinates of edge pixel points in each row or each column of the target image. The fingerprint image determining unit 13 is further configured to perform the fingerprint recognition on the texture image when coordinates of the edge pixel points corresponding to a preset number of adjacent rows or adjacent columns of the target image are gradually increased or decreased.

In addition, the target image acquiring unit 11 is further configured to determine an image in a preset area of the captured texture image as the target image.

The above apparatus provided by embodiments of the present disclosure may perform the methods provided in the first embodiment and the second embodiment of the present disclosure, thus includes corresponding functional modules configured to perform the above methods and has beneficial effects. For technical details that are not described in detail in the embodiment, reference may be made to the methods provided in the first embodiment and the second embodiment of the present disclosure.

In addition, the target shape feature includes a plurality of feature values. The feature value is configured to represent a width of a row or a length of a column of the target image.

Fourth Embodiment

Figure 12:
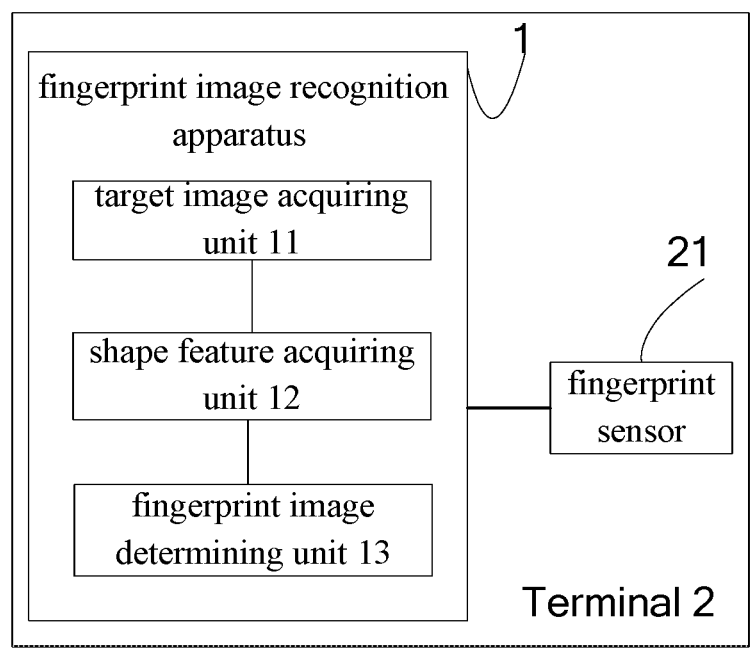
FIG. 12 is a block diagram of a terminal in a fourth embodiment of the present disclosure.

Embodiments of the present disclosure further provide a terminal 2. As illustrated in FIG. 12, the terminal 2 includes a fingerprint sensor 21 and a fingerprint image recognition apparatus 1. The fingerprint sensor 21 is coupled to the fingerprint image recognition apparatus 1. The fingerprint image recognition apparatus 1 includes a target image acquiring unit 11, a shape feature acquiring unit 12 and a fingerprint image determining unit 13.

The target image acquiring unit 11 is configured to acquire a target image from a captured texture image.

The shape feature acquiring unit 12 is configured to acquire a target shape feature corresponding to the target image acquired by the target image acquiring unit 11. The target shape feature is configured to represent a shape feature of the target image.

The fingerprint image determining unit 13 is configured to perform a fingerprint recognition on the texture image when the target shape feature acquired by the shape feature acquiring unit 12 matches with a preset finger shape feature.

In addition, the apparatus further includes a binarizing unit.

The binarizing unit is configured to perform a binarization processing on the target image acquired by the target image acquiring unit.

The target image acquiring unit is further configured to acquire the target shape feature corresponding to the target image binarized.

In addition, the shape feature acquiring unit is configured to acquire a sum of pixel values in each row or each column of the target image. The fingerprint image determining unit is further configured to perform the fingerprint recognition on the texture image when sums of pixel values corresponding to a preset number of adjacent rows or adjacent columns of the target image are gradually increased or decreased.

In addition, the shape feature acquiring unit is further configured to acquire coordinates of edge pixel points in each row or each column of the target image. The fingerprint image determining unit is further configured to perform the fingerprint recognition on the texture image when coordinates of the edge pixel points corresponding to a preset number of adjacent rows or adjacent columns of the target image are gradually increased or decreased.

In addition, the target image acquiring unit is further configured to determine an image in a preset area of the captured texture image as the target image.

The above terminal provided by embodiments of the present disclosure may perform the methods provided in the first embodiment and the second embodiment of the present disclosure, thus includes corresponding functional modules configured to perform the above methods and has beneficial effects. For technical details that are not described in detail in the embodiment, reference may be made to the methods provided in the first embodiment and the second embodiment of the present disclosure.

It should be noted that, the above is only preferred embodiments and technical principles of the present disclosure. It would be appreciated by those skilled in the art that the present disclosure is not limited to specific embodiments described herein, and various obvious changes, readjustments and alternatives can be made by those skilled in the art without departing from the scope of the present disclosure. Therefore, although the present disclosure has been described in detail by way of the above embodiments, the present disclosure is not limited to the above embodiments, and many other equivalent embodiments may be included without departing from the concept of the present disclosure. The scope of the present disclosure is determined by the scope of the appended claims.

What is claimed is:

1. A fingerprint image recognition method, comprising:
   acquiring a target image from a captured texture image;
   acquiring a target shape feature corresponding to the target image, the target shape feature being configured to represent a shape feature of the target image; and
   when the target shape feature matches with a preset finger shape feature, determining to perform a fingerprint recognition on the texture image,
   wherein, acquiring the target shape feature corresponding to the target image comprises:
   acquiring coordinates of edge pixel points in each row or each column of the target image;
   when the target shape feature matches with the preset finger shape feature, determining to perform the fingerprint recognition on the texture image comprises:
   when coordinates of the edge pixel points corresponding to a preset number of adjacent rows or adjacent columns of the target image are increased or decreased row by row or column by column, determining to perform the fingerprint recognition on the texture image.

2. The fingerprint image recognition method according to claim 1, further comprising:
   performing a binarization processing on the target image;
   wherein, acquiring the target shape feature corresponding to the target image comprises:
   acquiring the target shape feature corresponding to the target image binarized.

3. The fingerprint image recognition method according to claim 1, wherein, acquiring the target shape feature corresponding to the target image comprises:
   acquiring a sum of pixel values in each row or each column of the target image;
   when the target shape feature matches with the preset finger shape feature, determining to perform the fingerprint recognition on the texture image comprises:
   when sums of pixel values corresponding to a preset number of adjacent rows or adjacent columns of the target image are increased or decreased row by row or column by column, determining to perform the fingerprint recognition on the texture image.

4. The fingerprint image recognition method according to claim 3, after acquiring the sum of the pixel values in each row or each column of the target image, further comprising:
   acquiring a number of hop values in the sums, wherein the hop values represent noise points in the pixel values;

determining whether the number of the hop values is less than a preset threshold; and when yes, deleting the hop values.

5. The fingerprint image recognition method according to claim 1, wherein, acquiring the target image from the captured texture image comprises:

determining an image in a preset area of the captured texture image as the target image.

6. The fingerprint image recognition method according to claim 1, wherein, the target shape feature comprises a plurality of feature values, each feature value is configured to represent a width of a row or a length of a column of the target image.

7. A fingerprint image recognition apparatus, comprising a non-transitory computer-readable medium comprising computer-executable instructions stored thereon, and an instruction execution system which is configured by the instructions to implement at least one of:

a target image acquiring unit, configured to acquire a target image from a captured texture image;

a shape feature acquiring unit, configured to acquire a target shape feature corresponding to the target image acquired by the target image acquiring unit, the target shape feature being configured to represent a shape feature of the target image; and a fingerprint image determining unit, configured to perform a fingerprint recognition on the texture image when the target shape feature acquired by the shape feature acquiring unit matches with a preset finger shape feature, wherein, the shape feature acquiring unit is further configured to:

acquire coordinates of edge pixel points in each row or each column of the target image;

the fingerprint image determining unit is further configured to perform the fingerprint recognition on the texture image when coordinates of the edge pixel points corresponding to a preset number of adjacent rows or adjacent columns of the target image are increased or decreased row by row or column by column.

8. The fingerprint image recognition apparatus according to claim 7, wherein the instruction execution system is further configured by the instructions to implement:

a binarizing unit, configured to perform a binarization processing on the target image acquired by the target image acquiring unit;

wherein the target image acquiring unit is further configured to acquire the target shape feature corresponding to the target image binarized.

9. The fingerprint image recognition apparatus according to claim 7, wherein, the shape feature acquiring unit is configured to:

acquire a sum of pixel values in each row or each column of the target image;

the fingerprint image determining unit is further configured to perform the fingerprint recognition on the texture image when sums of pixel values corresponding to a preset number of adjacent rows or adjacent columns of the target image are gradually increased or decreased row by row or column by column.

10. The fingerprint image recognition apparatus according to claim 9, wherein, the shape feature acquiring unit is further configured to:

acquire a number of hop values in the sums after acquiring the sum of the pixel values in each row or each column of the target image, wherein the hop values represent noise points in the pixel values;

determine whether the number of the hop values is less than a preset threshold; and when yes, delete the hop values.

11. The fingerprint image recognition apparatus according to claim 7, wherein, the target image acquiring unit is further configured to:

determine an image in a preset area of the captured texture image as the target image.

12. The fingerprint image recognition apparatus according to claim 7, wherein, the target shape feature comprises a plurality of feature values, each feature value is configured to represent a width of a row or a length of a column of the target image.

13. A terminal, comprising:

a fingerprint sensor; and a fingerprint image recognition apparatus;

wherein, the fingerprint sensor is coupled to the fingerprint image recognition apparatus, the fingerprint image recognition apparatus comprises a non-transitory computer-readable medium comprising computer-executable instructions stored thereon, and an instruction execution system which is configured by the instructions to implement at least one of:

a target image acquiring unit, configured to acquire a target image from a captured texture image;

a shape feature acquiring unit, configured to acquire a target shape feature corresponding to the target image acquired by the target image acquiring unit, the target shape feature being configured to represent a shape feature of the target image; and a fingerprint image determining unit, configured to perform a fingerprint recognition on the texture image when the target shape feature acquired by the shape feature acquiring unit matches with a preset finger shape feature, wherein, the shape feature acquiring unit is further configured to:

acquire coordinates of edge pixel points in each row or each column of the target image;

the fingerprint image determining unit is further configured to perform the fingerprint recognition on the texture image when coordinates of the edge pixel points corresponding respectively to a preset number of adjacent rows or adjacent columns of the target image are increased or decreased row by row or column by column.

14. The terminal according to claim 13, wherein, the instruction execution system is further configured by the instructions to implement:

a binarizing unit, configured to perform a binarization processing on the target image acquired by the target image acquiring unit;

the target image acquiring unit is further configured to acquire the target shape feature corresponding to the target image binarized.

15. The terminal according to claim 13, wherein the shape feature acquiring unit is configured to:

acquire a sum of pixel values in each row or each column of the target image;

the fingerprint image determining unit is further configured to perform the fingerprint recognition on the texture image when sums of pixel values corresponding to a preset number of adjacent rows or adjacent columns of the target image are increased or decreased row by row or column by column.

16. The terminal according to claim 15, wherein, the shape feature acquiring unit is further configured to:

acquire a number of hop values in the sum of the pixel values after acquiring the sum of the pixel values in each row or each column of the target image, wherein the hop values represent noise points in the pixel values;

determine whether the number of the hop values is less than a preset threshold; and when yes, delete the hop values.

17. The terminal according to claim 13, wherein, the target image acquiring unit is further configured to:

determine an image in a preset area of the captured texture image as the target image.

* * * * *